United States Patent [19]

Salem et al.

[11] Patent Number: 5,022,997

[45] Date of Patent: Jun. 11, 1991

[54] METHOD FOR TREATING AQUEOUS SOLUTIONS

[75] Inventors: Eli Salem, Deal; Bruce L. Libutti, Teaneck, both of N.J.; Robert Kunin, Yardley, Pa.

[73] Assignee: The Graver Company, Union, N.J.

[21] Appl. No.: 452,194

[22] Filed: Dec. 18, 1989

[51] Int. Cl.$^5$ .......................... C02F 1/28; C02F 1/42; B01D 37/02

[52] U.S. Cl. .................... 210/670; 210/505; 210/679; 210/686; 210/692; 210/694; 210/777

[58] Field of Search ............... 210/670, 673, 679, 686, 210/690–692, 502.1, 503–505, 508, 694, 777

[56] References Cited

U.S. PATENT DOCUMENTS

| | | | |
|---|---|---|---|
| 3,250,702 | 5/1987 | Levendusky | 210/24 |
| 3,901,808 | 8/1975 | Bokros | 210/436 |
| 4,190,532 | 2/1980 | Halbfoster | 210/75 |
| 4,238,334 | 12/1980 | Halbfoster | 210/679 |
| 4,747,955 | 5/1988 | Kunin | 210/679 |

OTHER PUBLICATIONS

Ion Exchange Technology in Medicine and the Pharmaceutical Industry, AMBER-HI-LITES Nos. 142–5, Rohm and Haas Co., Philadelphia, Pa. (1974–1975).
Calmon C. and Kressman, T. R. E., Ion Exchange in Organic and Biochemistry, (1957).

Primary Examiner—Stanley Silverman
Assistant Examiner—Neil M. McCarthy
Attorney, Agent, or Firm—Dressler, Goldsmith, Shore, Sutker & Milnamow, Ltd.

[57] ABSTRACT

Methods for treating aqueous solutions and for recovering specific chemical products from an aqueous solution by ion exchange or adsorption by passing the aqueous solution through a regenerable filter bed comprising a flocculated mixture of finely divided active particulate material and filter aid materials having a depth of from about 3.0 inches to about 60 inches.

26 Claims, 4 Drawing Sheets

FIG-3 HYDRAULICS-POWDER FORMULATIONS

FIG-4 HYDRAULICS-POWDER FORMULATIONS

FIG_7_

FIG_8_

METHOD FOR TREATING AQUEOUS SOLUTIONS

FIELD OF THE INVENTION

The present invention relates to a method for treating aqueous solutions by ion exchange or adsorption by passing the aqueous solution through a regenerable filter bed comprising a flocculated mixture of finely divided active particulate material and filter aid materials having a depth in the range of about 3.0 inches to about 60 inches. The invention is further directed to a method for recovery, separation and purification of solutes on a regenerable basis utilizing finely divided ion exchangers and adsorbents without the normally expected high pressure drops typically associated with beds of fine particles at such depths.

BACKGROUND OF THE INVENTION

It is known to remove impurities from a liquid by passing the liquid through a filter screen that has been precoated with a thin layer of finely divided exchange resin particles. In U.S. Pat. No. 3,250,702 a method is described wherein a mixture of anion and cation exchange resin in the size range 60 to 400 mesh is precoated on a filter screen. The resins are combined in aqueous suspension causing the resins to agglomerate or "clump" with one another to form larger particles. In so doing, a greater void space is provided in the precoat layer of finely divided resin particles so that there is less resistance to flow of liquid through the precoat layer, and therefore a lower pressure drop across the filter.

In U.S. Pat. No. 4,190,532 a method is described for removing impurities from a liquid by passing the liquid through a precoat layer which has been deposited on a filter screen. The precoat layer consists of a treated filter aid material mixed with ion exchange resin particles in the size range of 60 to 400 mesh. The filter aid material, characterized by a negative surface charge in aqueous suspension, is treated with an electrolyte-type compound that produces a positive surface charge thereon. The mixture of treated filter aid material and ion exchange resin particles produces a clumping phenomenon similar to that achieved in accordance with U.S. Pat. No. 3,250,702.

In U.S. Pat. No. 4,238,334 a method is described for removing impurities from a liquid by passing the liquid through a precoat layer which has been deposited on a screen. The precoat screen consists of a treated fibrous filter aid material and an active particulate material. The treated filter aid material and the active particulate material have opposite surface charges in aqueous suspension, and the mixture produces the aforementioned clumping phenomenon. The filter aid material is treated with an electrolyte-type compound that produces a surface charge opposite to the normal surface charge of the filter aid material.

It has heretofore been known to utilize small quantities of powdered anion exchange resin in the hydroxide form to enhance flocculation of hydrolyzed polyester-based precoats as described in U.S. Pat. No. 4,474,955.

The above discussed liquid treatment methods have been widely commercially utilized in thin precoat layers (typically less than about one inch) for removal of traces of impurities from water and chemical process streams. However, because of pressure drop limitations, the utilization of such precoat materials in thicker layers or beds to remove higher concentrated impurities has heretofore not been deemed commercially viable. Further, it has been the heretofore practice to dispose of the thin precoat layers after each use rather than to regenerate it for subsequent use, as it has heretofore not been considered possible to maintain flocculation characteristics after regeneration.

There are numerous instances of the use of ion exchange and adsorptive processes for recovering and purifying various pharmaceutical, medicinal and biological substances. These processes primarily involve separation and concentration techniques. Since most of the substances being recovered and purified are of high molecular weight, small particles of ion exchangers and adsorbents are preferred because of kinetic considerations. In most instances, the kinetic process involved in the adsorption and elution of high molecular weight species is controlled by particle diffusion which follows the relationship in which the rate is inversely proportional to the square of the particle diameter. Since the relationship between diffusion rate and molecular weight is also an inverse relationship, it is apparent that fine particles are required for the processing of many pharmaceutical products by ion exchange or adsorption.

In small scale operations, there are essentially little problems associated with the use of fine particles of ion exchange resins. For example, 5–10 micron particles of ion exchange resins have been routinely used for a myriad of analytical procedures. On a small scale, the hydraulic problems associated with the columnar performance of fine particles is of little consequence. However, scale-up of these laboratory systems based upon fine particles is quite difficult because of the high pressure drop involved.

SUMMARY OF THE INVENTION

It has been discovered that beds of flocculated fine particle formulations having a depth of from about 3.0 inches to about 60 inches may be utilized to remove impurities from a liquid or to recover, separate and purify selected substances from of a liquid at flow rates and pressure differentials that permit commercial scale operations. In accordance with the invention, the bed comprises a mixture of finely divided active particulate material that produces a clumping phenomenon. The flow rate through the bed is preferably greater than about 0.02 gpm/ft$^2$ and the pressure differential through the bed is preferably less than about 3.0 psi/in at 5 gpm/ft$^2$ and most preferably less than about 1.0 psi/in at 5 gpm/ft$^2$.

In accordance with an embodiment of the invention the filter bed may comprise a mixture of active particulate material in the size range of from about 5.0 to about 100 microns and filter aid particles. The active particulate material and the filter aid particles have opposite surface charges in aqueous suspension so that the mixture produces a clumping phenomenon. In another embodiment of the invention the filter bed may comprise a mixture of an ion exchange resin and resin of the opposite charge that produces a floccing or clumping phenomenon. In a further embodiment of the invention the filter bed may comprise a mixture of an active particulate material, treated filter aid particles and resin of the opposite charge from the active particulate material that produces a floccing or clumping phenomenon.

It has further been discovered that such filter beds may be regenerated by directing an appropriate regenerant therethrough, while substantially maintaining the flocculation characteristics of the bed after regeneration.

The term "active particulate material" as used herein refers to materials such as ion exchange resins, activated carbon, adsorptive clays such as bentonite, molecular sieves such as zeolites, zirconium oxides, zirconium phosphate, iron sulfide, diatomaceous search, synthetic adsorbents and activated alumina. Particularly preferred active particulate materials are ion exchange resins and zeolites.

The term "filter aid materials" as used herein refers to materials that aid the filtration which is produced by the filter. Such materials are well known in the art, and may include cellulose fibers, diatomaceous earth, charcoal, expanded perlite, asbestos fibers, polyacrylonitrile fibers, Teflon fibers, nylon fibers, rayon fibers, polypropylene fibers, polyvinyl chloride fibers, polyester fibers, ion exchange resins and the like. Particularly preferred filter aid particles for use in accordance with the invention are cellulose fibers and polyester fibers.

An even further embodiment of the invention provides a method for removing and recovering specific chemical substances present in a solution by directing the chemical substance containing solution through a filter bed of the above-mentioned type that contains ion exchange or adsorption material for removing the substance in solution. An eluting solution is subsequently directed through the filter bed for recovering the removed substance from the filter bed. The filter bed is regenerated to permit its reuse in subsequent removal and recovery cycles.

DESCRIPTION OF THE INVENTION

According to the present invention, substances are removed from a liquid by directing the liquid through a filter bed comprising flocculated active particulate material in the average size range of from about 5.0 to about 100 microns, most preferably from about 30 microns to about 100 microns and having a depth in the range of from about 3.0 inches to about 60 inches, most preferably from about 10 inches to about 40 inches. It is unexpected that the pressure drops through beds of finally divided materials of such depths are quite similar to those exhibited by beds of normal size bead resins. The active particulate material may be flocculated by mixing same with a filter aid material having an opposite surface charge. The desired surface charge may be imparted to the filter aid material in the manner as described in U.S. Pat. No. 4,238,334, which patent is assigned to the assignee of the present invention and is incorporated herein by reference. The flow rates through the bed are preferably greater than about 0.02 gm/ft², most preferably greater than about 0.2 gpm/ft² and the pressure differential therethrough is generally less than about 3.0 psi/in at 5 gpm/ft², most preferably less than about 1.0 psi/in at 5 gpm/ft².

The filter bed includes an active particulate material that is selected dependent upon the specific application in a well known manner. The active particulate material preferably comprises from about 5.0 percent to about 99 percent by weight. In accordance with presently considered preferred embodiments of the invention the active particulate material may include ion exchange resins or zeolites.

The filter bed may also include a filter aid material that has a surface charge that is opposite the surface charge of the active particulate material. While the particular filter aid material is not critical, it is important that it normally has a surface charge in aqueous suspension. The particular preferred filter aid materials for use in accordance with the present invention are treated cellulose fibers or treated polyester fibers. The cellulose fibers are preferably treated in accordance with the procedures disclosed in U.S. Pat. No. 3,238,334. The polyester fibers are preferably previously treated in accordance with the procedures disclosed in U.S. Pat. No. 4,747,955.

The filter bed may also comprise an active particulate material of average particle size from about 5.0 to about 100 microns and a small quantity of ballmilled resins of opposite charge resins having a size from about 5.0 to about 30 microns. The active particulate material may include any ion exchanger or absorbent which is charged and may be powdered. The ballmilled resins comprise from about 0.5 percent to about 10 percent by weight (preferably about 1.0 percent) of the mixture.

In accordance with a further preferred embodiment of the invention the filter bed comprises a mixture of an active particulate material, a fibrous filter aid material and a small quantity of ballmilled resins. The active particulate material is selected dependent upon the specific application and may be any exchanger or absorbent which may be powdered. The active particulate material is preferably powdered ion exchange resins having a size from about 5.0 to about 100 microns. Examples of such resins are Amberlite IRP-64 and powdered Amberlite IR-120 produced by Rohm and Haas Company of Philadelphia, Pa. The active particulate material preferably comprises from about 5.0 percent to about 99 percent by weight (most preferably about 74 percent) of the mixture. The fibrous filter aid material may include the filter aid materials discussed above. The filter aid material is preferably cellulose fibers treated in accordance with U.S. Pat. No. 3,238,334 or polyester fibers treated in accordance with U.S. Pat. No. 4,747,955. The ballmilled ion exchange resins comprise from about 0.5 percent to about 10 percent by weight (preferably about 1.0% percent) of the mixture. If the active particulate material is uncharged, the ballmilled resin should be of opposite charge from the charged filter aid material.

It has also been discovered that these filter beds may be regenerated by directing an appropriate regenerant solution therethrough, while surprisingly substantially maintaining the flocculation and hydraulic characteristics of the bed after repeated regeneration cycles. The selection of the particular regenerant is dependent upon the active particulate material utilized and the particular application in a well known manner. A typical regeneration cycle includes the known steps of rinsing the bed, directing the regenerant solution through the bed, and rinsing the bed. As will be described in greater detail in the Examples that are set forth hereinbelow, tests have shown that after some degradation in hydraulic performance after the first few regeneration cycles, the hydraulic performance stabilizes at a level that permits normal limits of performance.

The filter beds in accordance with the present invention are particularly suited for utilization in the recovery, separation and purification of pharmaceutical, medicinal, and biological substances since most of these substances are of high molecular weight, wherein small particles of ion exchangers and absorbents are preferred because of kinetic considerations. In order to permit commercial scale-up it is necessary that the filter beds have pressure drops of under 60 psi and flow rates of from 0.2 gpm/ft$^2$ to about 5.0 gpm/ft$^2$. As will be shown in the discussion of the Examples that hereinbelow follow, the filter beds of the invention surprisingly have pressure drops normally expected only in large bead filter beds of comparable depths.

As is typical in pharmaceutical and biological substance recovery, separation and purification processes, a solution containing the substances is directed through a filter bed selected to remove or load that particular substance onto the active particulate material in the filter bed. The substance is then eluted or separated from the filter bed by directing a selected eluent through the filter bed. The filter bed may then be regenerated for reuse by directing a selected regenerant through the filter bed followed by a rinse step. Amberlite IRP-64 and Amberlite IRC-50 are widely used cation exchange resins throughout the pharmaceutical industry.

Figure 8:
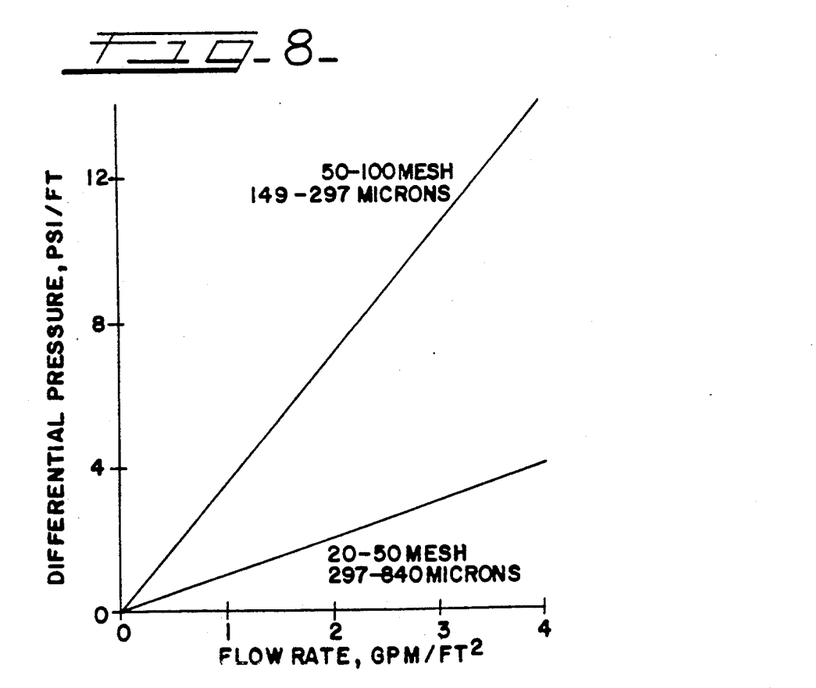
FIG. 8 is a graph showing the relationships between particle size and pressure drop for relatively coarse particles.

The unique hydraulic behavior of the flocculated ion exchange and adsorbent filter beds in accordance with the invention will be illustrated in the Examples that follow. For purpose of comparison the relationship between particle size and pressure drop for relatively coarse particles is shown in FIG. 8.

EXAMPLE I

Figure 1:
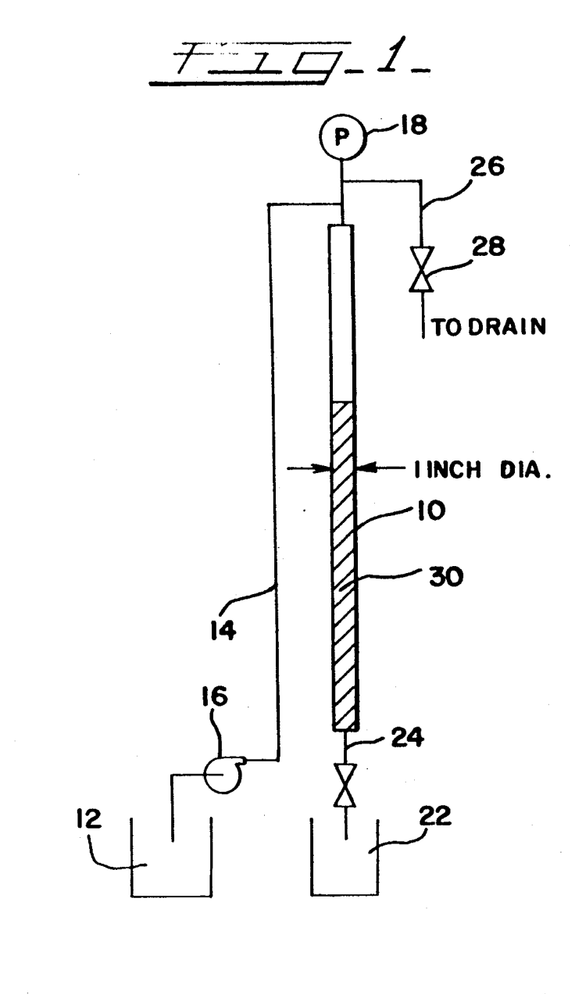
FIG. 1 is a schematic representation of a test apparatus used in certain of the Examples.

A test apparatus, as shown in FIG. 1, is utilized to establish the differential pressure through certain filter beds in accordance with the invention. The apparatus comprises a column 10 having an inner diameter of 1.0 inches. A feed container 12 is in communication with the upper end of column 10 through an inlet line 14 having a peristaltic pump 16 (Cole Palmer Instrument Co., Head-Model No. 7016, Drive Model No. 7553-10) associated therewith. A pressure gage 18 (Marshaltown Model 91701, 0-30 psi) is provided in communication with the upper portion of column 10. An effluent line 20 is in communication with the lower end of column 10 and an effluent collection container 22. A valve 24 is provided in line 20. A line 26, having a valve 28 associated therewith, is provided to drain the column.

A powdered resin formulation is prepared from a mixture of methacrylic acid-based Amberlite IRP-64 (H$^+$) cation exchange resins (manufactured by Rohm and Haas Company), filter aid material comprising treated fiber particles, and ballmilled anion exchange resins in the hydroxide form such as Dowex I (Dow Chemical Company, Midland, Mich.) and Amberlite IRA-400 (Rohm and Haas Company, Philadelphia Pa.). The median particle size of the Amberlite IRP-64 is about 86 microns. The fiber particles are cellulose fibers and are treated with Betz 1175 polyelectrolyte (0.015 g/g fiber) in accordance with the procedures disclosed in U.S. Pat. No. 4,238,334. The mixture comprises by weight 25% treated cellulose fibers, 74% IRP-64 resins and 1% ballmilled anion exchange resins.

The above formulation of materials is positioned in column 10 to form a bed as indicated at 30 in FIG. 1. The depth of the bed is measured and recorded. DI (deionized) water is directed through the bed at different flow rates and the pressure differential is recorded. The test results for beds having a depth of 3.0 inches, 7.0 inches, 15.5 inches, 30.0 inches and 40.0 inches are set forth in Table I.

TABLE I

| Depth (in) | Flow (gpm/ft$^2$) | PSI | (PSI/in) |
|---|---|---|---|
| 3 | 4.6 max | 0 | 0 |
| 7 | 4.6 | 0.8 | 0.11 |
| 7 | 4.0 | 0 | 0 |
| 15.5 | 4.8 | 7.8 | 0.50 |
| 15.5 | 3.8 | 5.9 | 0.38 |
| 15.5 | 2.8 | 3.9 | 0.25 |
| 15.5 | 1.8 | 1.7 | 0.11 |
| 15.5 | 0.94 | 0 | 0 |
| 30 | 4.8 | 22.0 | 0.73 |
| 30 | 4.0 | 16.7 | 0.56 |
| 30 | 2.7 | 10.5 | 0.35 |
| 30 | 1.8 | 6.7 | 0.22 |
| 30 | 0.8 | 2.0 | 0.07 |
| 30 | 0.5 | 0 | 0 |
| 40 | 4.7 | 27.5 | 0.69 |
| 40 | 3.5 | 20.6 | 0.52 |
| 40 | 2.4 | 13.8 | 0.35 |
| 40 | 1.7 | 9.7 | 0.24 |
| 40 | 0.75 | 3.0 | 0.07 |
| 40 | 0.40 | 0 | 0 |

Figure 2:
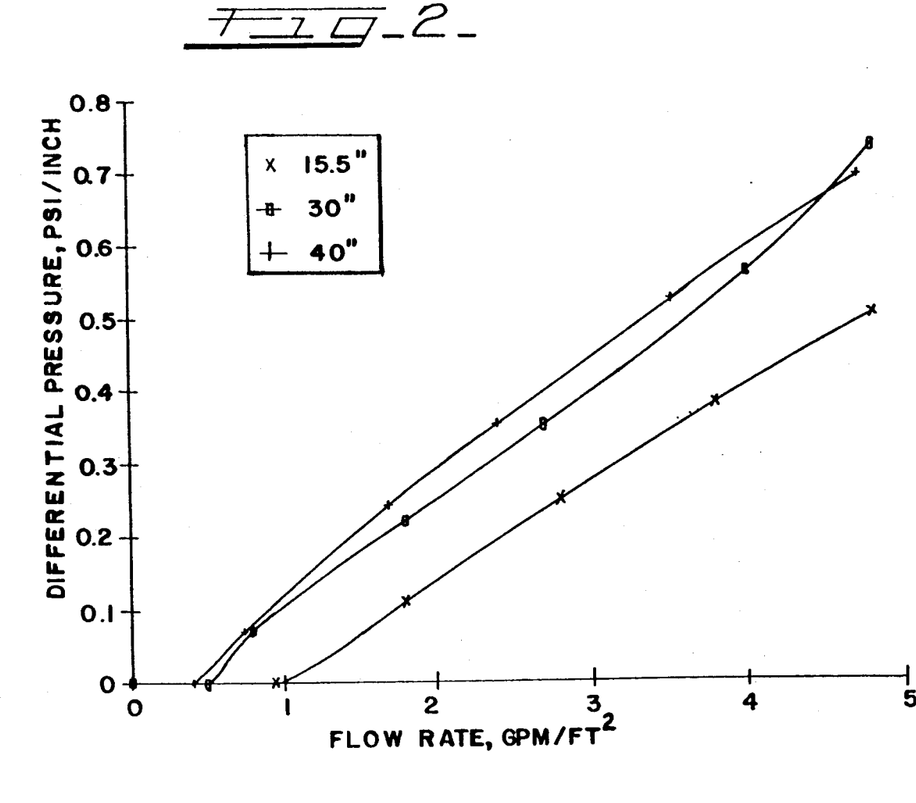
FIGS. 2–4 are graphs showing the effect of bed depth on differential pressure (psi/inch) through certain filter beds of different formulations at various flow rates.

These test results are graphically presented in FIG. 2.

EXAMPLE II

Figure 3:
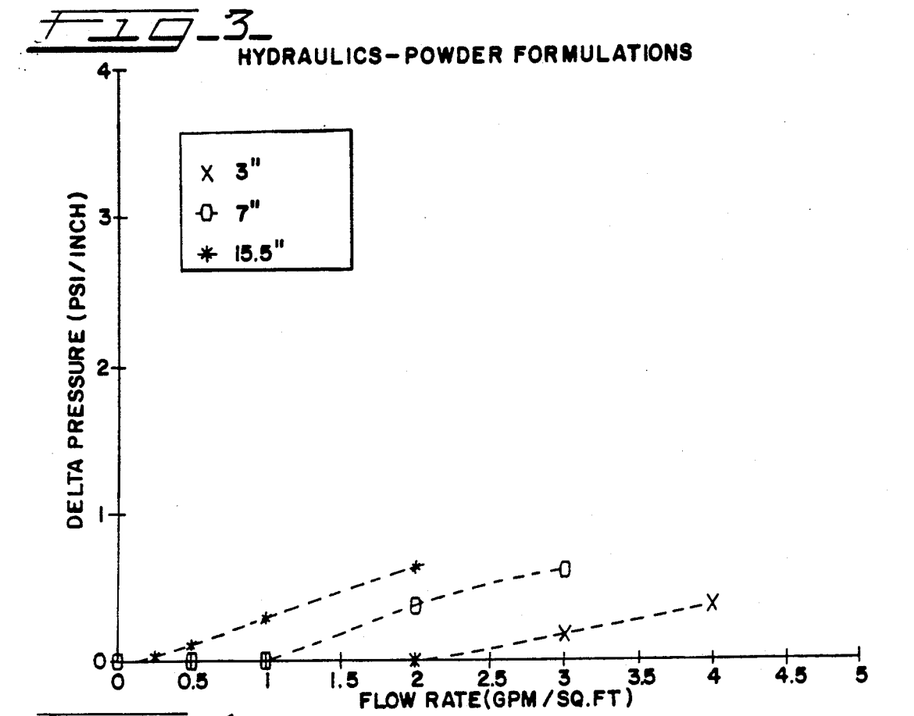

The same tests as discussed in Example I are conducted on beds of a formulation of 50% by weight Amberlite IRP-64 resins and 50% by weight treated cellulose fibers. The cellulose fibers are treated as discussed above in Example I. The results of these tests for beds having a depth of 3.0 inches, 7.0 inches and 15.5 inches are set forth in Table II and graphically presented in FIG. 3.

TABLE II

| Depth (in) | Flow (gpm/ft$^2$) | PSI | (PSI/in) |
|---|---|---|---|
| 3 | 4 | 2.3 | 0.37 |
| 3 | 3 | 1.7 | 0.17 |
| 3 | 2 | 0.7 | 0 |
| 3 | 1 | 0 | 0 |
| 3 | 0.5 | 0 | 0 |
| 7 | 3 | 5.4 | 0.6 |
| 7 | 2 | 3.8 | 0.37 |
| 7 | 1 | 1.3 | 0.01 |
| 7 | 0.5 | 0.3 | 0 |
| 15.5 | 2 | 10.8 | 0.62 |
| 15.5 | 1 | 5.7 | 0.29 |
| 15.5 | 0.5 | 2.8 | 0.10 |
| 15.5 | 0.25 | 1.6 | 0.03 |

For purpose of comparison, the same tests as discussed above in Example I are conducted on the beds made from the formulations as set forth above in this Example but with the cellulose fibers that have not been treated with the Betz 1175 polyelectrolyte. The results of these tests for beds having a depth of 3.75 inches, 7.0 inches and 11.0 inches is set forth in Table III.

TABLE III

| Depth (in) | Flow (gpm/ft²) | PSI | (PSI/in) |
|---|---|---|---|
| 3.75 | 4.8 | 4.0 | 1.07 |
| 7 | 4.7 | 21.2 | 3.03 |
| 11 | 1.8 | 30 | 2.73 |

EXAMPLE III

Figure 4:
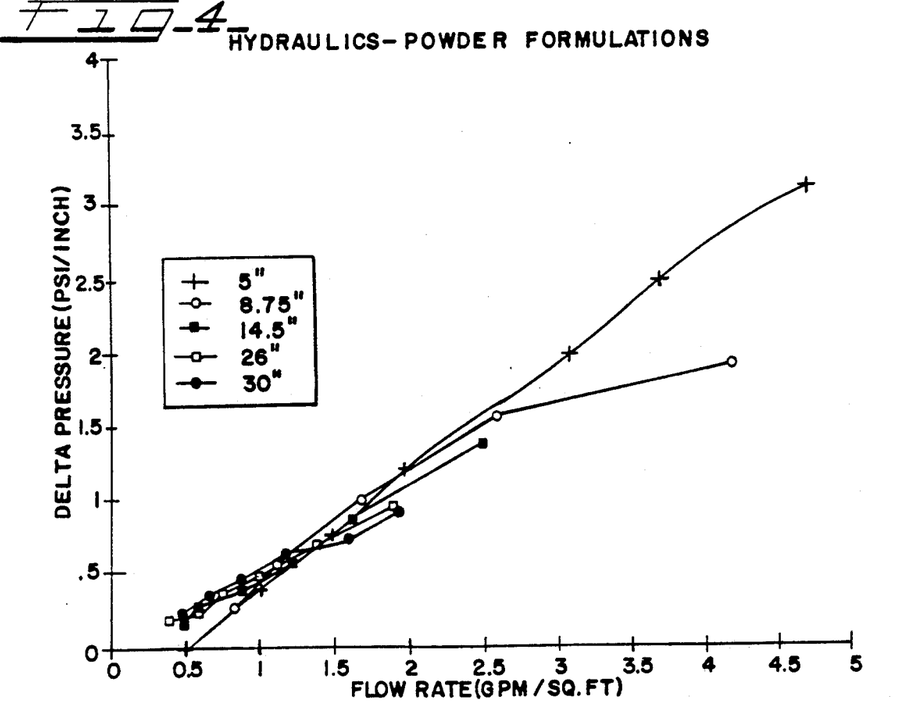

The same tests as discussed above in Example I are conducted on beds of a formulation of 99% by weight Amberlite IRP-64 resins and 1% by weight of ballmilled Dowex I. The IRP-64 resins and ballmilled Dowex I is prepared as discussed above with respect to Example I. The test results for beds having a depth of 5.0 inches, 8.75 inches, 14.5 inches, 26.0 inches and 30.0 inches are set forth in Table IV and graphically presented in FIG. 4.

TABLE IV

| Depth (in) | Flow (gpm/ft²) | PSI | (PSI/in) |
|---|---|---|---|
| 5 | 4.7 | 15.3 | 3.06 |
| 5 | 3.7 | 12.3 | 2.46 |
| 5 | 3.1 | 9.8 | 1.96 |
| 5 | 2.0 | 6.0 | 1.20 |
| 5 | 1.5 | 3.7 | 0.74 |
| 5 | 1.0 | 2.0 | 0.40 |
| 5 | 0.5 | 0 | 0 |
| 8.75 | 4.2 | 16.8 | 1.92 |
| 8.75 | 2.6 | 13.3 | 1.52 |
| 8.75 | 1.7 | 8.7 | 1.00 |
| 8.75 | 1.1 | 4.8 | 0.55 |
| 8.75 | 0.8 | 2.6 | 0.30 |
| 14.5 | 2.5 | 19.6 | 1.35 |
| 14.5 | 1.6 | 12.3 | 0.85 |
| 14.5 | 1.2 | 8.0 | 0.55 |
| 14.5 | 0.9 | 5.6 | 0.39 |
| 14.5 | 0.6 | 3.6 | 0.25 |
| 14.5 | 0.5 | 2.3 | 0.16 |
| 26 | 1.9 | 22.8 | 0.88 |
| 26 | 1.4 | 16.0 | 0.62 |
| 26 | 1.0 | 12.0 | 0.46 |
| 26 | 0.8 | 9.2 | 0.35 |
| 26 | 0.6 | 5.7 | 0.22 |
| 26 | 0.4 | 3.4 | 0.13 |
| 30 | 1.9 | 26.0 | 0.87 |
| 30 | 1.6 | 21.6 | 0.72 |
| 30 | 1.2 | 16.3 | 0.54 |
| 30 | 0.9 | 11.6 | 0.39 |
| 30 | 0.7 | 9.1 | 0.30 |
| 30 | 0.5 | 5.8 | 0.19 |

For purpose of reference, the psi/in of a 3.5 inch bed of finely divided IRP-64 resins through the test apparatus at a flow rate of 0.16 gpm/ft² is 8.57. The relationship between particle size and pressure drop for resins having a size of 149-297 microns and 297-840 microns is presented in FIG. 8. The hydraulic properties of the flocculated finely divided particle filter beds in Examples I-IV are quite similar to those exhibited by beds of normal resin beads. The hydraulic properties of such beds up to a couple of inches may have been expected, but the hydraulic properties for deeper beds was very unexpected.

EXAMPLE IV

Figure 5:
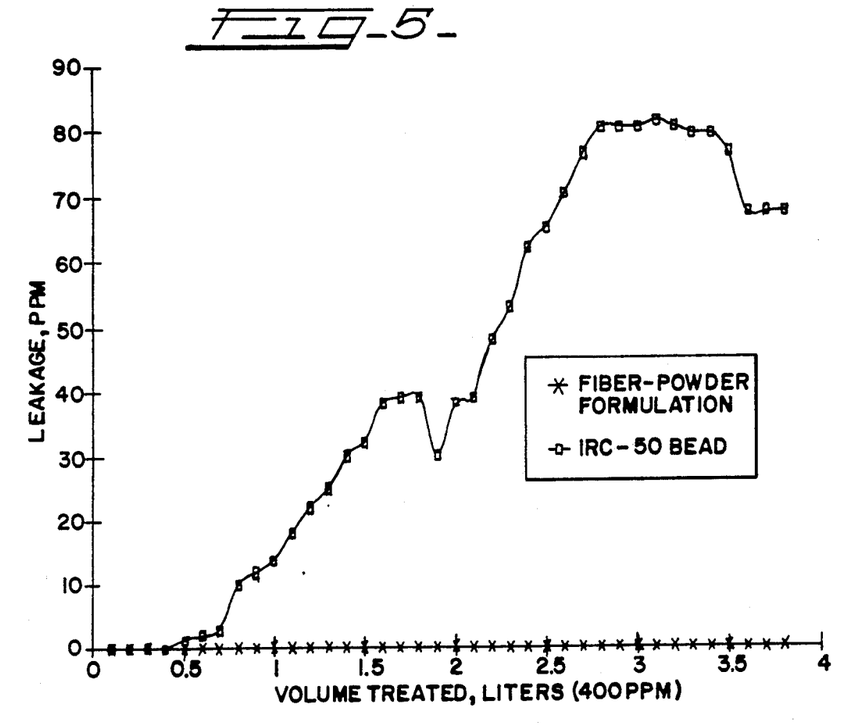
FIG. 5 are graphs showing the adsorption or loading of Vitamin $B_{12}$ in a filter bed in accordance with the invention and in a filter bed of normal bead resins.

The following Example is a test to establish the adsorption or loading abilities of an exemplary bed in accordance with the invention in comparison to a bed of normal bead resins. The test apparatus shown in FIG. 1, is utilized in this example. A 400 ppm solution of Vitamin $B_{12}$ is prepared from Vitamin $B_{12}$ obtained from Eastman Kodak, Catalog #B6 8463. A bed having a depth of 24 inches is provided in the column that comprises a mixture of Amerlite IRP-64 cation exchange resins, hydrolyzed polyester fibers, and ballmilled anion exchange resins. The mixture contains 74% IRP-64 resins and 1% ballmilled anion exchange resins as described in Example 1. This mixture also contains 25% polyester fibers which are treated with a 4% caustic solution at 140° F. for one hour and Betz 1175 polyelectrolyte as disclosed in U.S. Pat. No. 4,747,955. The solution is directed downwardly through the bed at the rate of 0.25 gpm/ft²(10.3 ml/min). The concentration of the effluent is determined at 100 ml intervals utilizing a Bausch and Lomb Spectronic 20 unit and recorded. These data are reflected in Table V and are graphically presented in FIG. 5.

TABLE V

| Liters Treated | ABS* | Leakage, ppm $B_{12}$ | Liters Treated | ABS | Leakage ppm $B_{12}$ |
|---|---|---|---|---|---|
| 0.1 | 0 | 0 | 2.0 | 0 | 0 |
| 0.2 | 0 | 0 | 2.1 | 0 | 0 |
| 0.3 | 0 | 0 | 2.2 | 0 | 0 |
| 0.4 | 0 | 0 | 2.3 | 0 | 0 |
| 0.5 | 0 | 0 | 2.4 | 0 | 0 |
| 0.6 | 0 | 0 | 2.5 | 0 | 0 |
| 0.7 | 0 | 0 | 2.6 | 0 | 0 |
| 0.8 | 0 | 0 | 2.7 | 0 | 0 |
| 0.9 | 0 | 0 | 2.8 | 0 | 0 |
| 1.0 | 0 | 0 | 2.9 | 0 | 0 |
| 1.1 | 0 | 0 | 3.0 | 0 | 0 |
| 1.2 | 0 | 0 | 3.1 | 0 | 0 |
| 1.3 | 0 | 0 | 3.2 | 0 | 0 |
| 1.4 | 0 | 0 | 3.3 | 0 | 0 |
| 1.5 | 0 | 0 | 3.4 | 0 | 0 |
| 1.6 | 0 | 0 | 3.5 | 0 | 0 |
| 1.7 | 0 | 0 | 3.6 | 0 | 0 |
| 1.8 | 0 | 0 | 3.7 | 0 | 0 |
| 1.9 | 0 | 0 | 3.8 | 0 | 0 |

*Absorbance at 550 nanometers

The above test is repeated by directing the solution through a bed of Amberlite IRC-50 cation exchange bead resin (manufactured by Rohm and Haas Company) having a depth of 24 inches at a flow rate of 0.25 gpm/ft² (10.3 ml/min). These resins have a median particle size of about 660 microns. The data from this test are reflected in Table VI and are graphically represented in FIG. 5.

TABLE VI

LOADING OF VITAMIN $B_{12}$ ON BEADS

| Liters Treated | ABS* | Leakage, ppm $B_{12}$ | Liters Treated | ABS | Leakage, ppm $B_{12}$ |
|---|---|---|---|---|---|
| 0.1 | 0 | 0 | 2.0 | 0.425 | 38 |
| 0.2 | 0 | 0 | 2.1 | 0.47 | 39 |
| 0.3 | 0 | 0 | 2.2 | 0.54 | 48 |
| 0.4 | 0.005 | <1 | 2.3 | 0.60 | 53 |
| 0.5 | 0.018 | 1 | 2.4 | 0.72 | 65 |
| 0.6 | 0.040 | 2 | 2.5 | 0.81 | 65 |
| 0.7 | 0.070 | 3 | 2.6 | 0.85 | 76 |
| 0.8 | 0.097 | 10 | | | |
| 0.9 | 0.130 | 12 | 2.8 | 0.85 | 80 |
| 1.0 | 0.165 | 14 | 2.9 | 0.85 | 80 |
| 1.1 | 0.205 | 18 | 3.0 | 0.85 | 80 |
| 1.2 | 0.255 | 22 | 3.1 | 0.86 | 81 |
| 1.3 | 0.295 | 25 | 3.2 | 0.85 | 80 |
| 1.4 | 0.350 | 30 | 3.3 | 0.83 | 79 |
| 1.5 | 0.380 | 32 | 3.4 | 0.82 | 79 |
| 1.6 | 0.425 | 38 | 3.5 | 0.80 | 76 |
| 1.7 | 0.47 | 39 | 3.6 | 0.74 | 67 |
| 1.8 | 0.47 | 39 | 3.7 | 0.74 | 67 |

TABLE VI-continued

LOADING OF VITAMIN B$_{12}$ ON BEADS

| Liters Treated | ABS* | Leakage, ppm B$_{12}$ | Liters Treated | ABS | Leakage, ppm B$_{12}$ |
|---|---|---|---|---|---|
| 1.9 | 0.360 | **30 | 3.8 | 0.74 | 67 |

*Absorbance at 550 nanometers
**Stopped flow for ½ hour

EXAMPLE V

Figure 6:
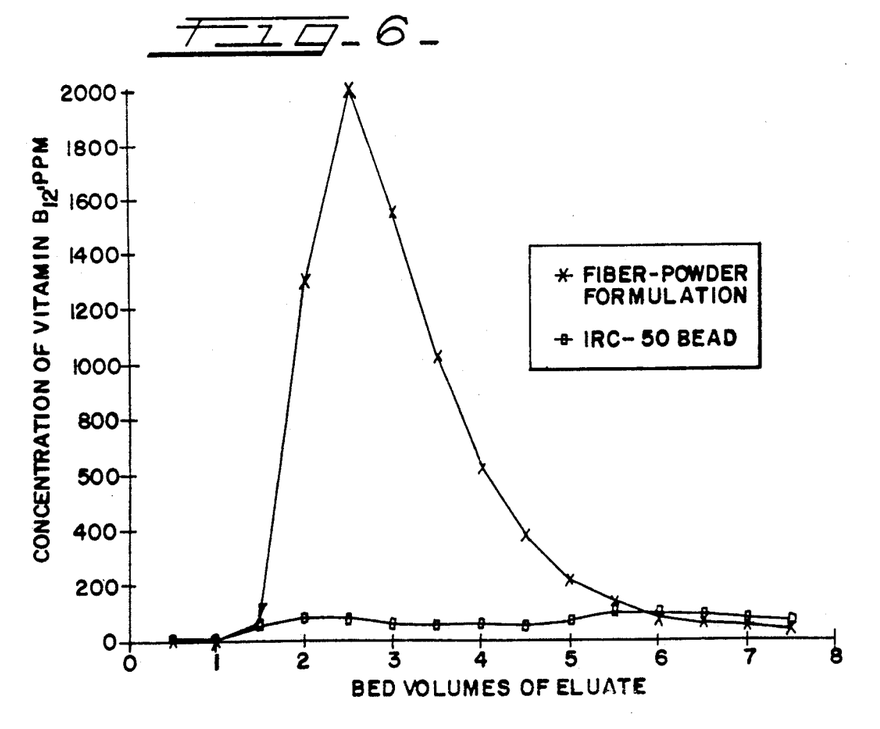
FIG. 6 are graphs showing the elution of Vitamin $B_{12}$ from a filter bed in accordance with the invention and from a filter bed of normal bead resins.

The following Example is to establish the desorption or elution characteristics of an exemplary bed in accordance with the invention in comparison to a bed of normal bead resins. The test apparatus shown in FIG. 1 is utilized in this Example. A bed having a depth of 24 inches is provided in the column comprising a mixture of Amberlite IRP-64 cation exchange resins, hydrolyzed polyester fibers, and ballmilled PAO (OH$^-$) anion exchange resins as described in Example IV. The bed is loaded by directing 3.8 liters of 400 ppm solution of Vitamin B$_{12}$ through the bed in the manner described in Example IV. An eluent comprising 3 parts 1 N HCl and 1 part acetone is directed downwardly through the bed at a flow rate of 0.025 gpm/ft$^2$ (1.03 ml/min). The effluent is collected at 0.5 volumes (175 ml) intervals. The concentration of each bed volume is measured on a Bausch and Lamb Spechronic 20 and recorded. These data are reflected in Table VI and are graphically presented in FIG. 6.

TABLE VII

ELUTION OF VITAMIN B$_{12}$ FROM POWDER

| Bed Vols. | ABS* | ppm B$_{12}$ | Concentration Comments |
|---|---|---|---|
| 0.5 | 0 | 0 | |
| 1.0 | 0 | 0 | |
| 1.5 | 0.75 | 70 | 1 Inch Cell |
| 2.0 | 0.31 × 50 | 130 | 1 ml of eluate to 50 mls DI Water |
| 2.5 | 0.45 × 50 | 2000 | 1 ml of eluate to 50 mls DI Water |
| 3.0 | 0.34 × 50 | 1550 | 1 ml of eluate to 50 mls DI Water |
| 3.5 | 0.23 × 25 | 1025 | 1 ml of eluate to 50 mls DI Water |
| 4.0 | 0.28 × 25 | 625 | 2 mls of eluate to 50 mls DI Water |
| 4.5 | 0.42 × 10 | 380 | 5 mls of eluate to 50 mls DI Water |
| 5.0 | 0.50 × 5 | 220 | 10 mls of eluate to 50 mls DI Water |
| 5.5 | 0.75 × 2 | 140 | 25 mls of eluate to 50 mls DI Water |
| 6.0 | 0.9 | 86 | 25 mls of eluate to 50 mls DI Water |
| 6.5 | 0.73 | 66 | |
| 7.0 | 0.62 | 56 | |
| 7.5 | 0.46 | 40 | |

*Absorbance at 550 nanometers

The above test is repeated by directed the 400 ppm solution of Vitamin B$_{12}$ solution downwardly through a 24 inch bed of Amberlite IRC-50 cation exchange bead resin in the manner as described in Example IV. The effluent is collected at 0.5 bed volume (175 ml) intervals and the concentration thereof is measured as set forth above. These data are reflected in Table VIII and are graphically presented in FIG. 6.

TABLE VIII

ELUTION OF VITAMIN B$_{12}$ FROM BEADS

| Bed Volume | ABS* | CONCENTRATION ppm B$_{12}$ |
|---|---|---|
| 0.5 | 0.138 | 11 |
| 1.0 | 0.128 | 10 |
| 1.5 | 0.64 | 58 |
| 2.0 | 0.92 | 88 |
| 2.5 | 0.87 | 84 |
| 3.0 | 0.67 | 62 |
| 3.5 | 0.70 | 64 |
| 4.0 | 0.67 | 62 |
| 4.5 | 0.64 | 58 |
| 5.0 | 0.83 | 78 |
| 5.5 | 1.10 | 105 |
| 6.0 | 1.00 | 98 |
| 6.5 | 0.95 | 96 |
| 7.0 | 0.87 | 84 |
| 7.5 | 0.83 | 77 |

*Absorbance at 550 nanometers

From the above Examples it has been established that the flocculated finely divided particulate bed in accordance with the invention has the loading and elution characteristics of the fine particles and the hydraulic properties of conventional bead resin beds.

EXAMPLE VI

The ability of the bed to maintain hydraulic performance is of considerable importance if the bed is to be employed in a cyclical process. A series of cycles are performed on the bed to expose the bed repeatedly to the swelling and shrinking conditions experienced during the loading, elution and regeneration steps of each cycle. A bed having a depth of 30 inches is provided in the column of FIG. 1 having the formulation as described in Example IV. During each cycle the bed is subjected to the steps of directing DI water through the bed, directing a pH 7 buffer through the bed, directing 1000 ml of 0.2N NH$_4$OH eluent solution through the bed, directing 1680 ml of rinse DI water through the bed, directing 750 ml IN NaOH regenerant solution through the bed and directing 1680 ml of rinse DI water through the bed. At the conclusion of each cycle the depth of the bed is measured and the flow rate and pressure drop is determined. These data are reflected in Table IX.

TABLE IX

MAINTENANCE OF HYDRAULICS

| End of Cycle | Bed Depth, in | Flow, gpm/ft$^2$ | P, psi | psi/in |
|---|---|---|---|---|
| 1 | 20.0 | 1.4 | 20 | 1.0 |
| 2 | 19.8 | 1.3 | 20 | 1.0 |
| 3 | 19.3 | 1.0 | 20 | 1.0 |
| 4 | 19.0 | 0.9 | 20 | 1.0 |
| 5 | 19.1 | 1.0 | 20 | 1.0 |
| 6 | 19.0 | 1.0 | 20 | 1.0 |
| 7 | 18.8 | 0.9 | 20 | 1.1 |
| 8 | 18.8 | 0.9 | 20 | 1.1 |
| 9 | 18.6 | 0.8 | 20 | 1.1 |

TABLE IX-continued

| | MAINTENANCE OF HYDRAULICS | | | |
|---|---|---|---|---|
| End of Cycle | Bed Depth, in | Flow, gpm/ft² | P, psi | psi/in |
| 10 | 18.6 | 0.8 | 20 | 1.1 |
| 11 | 18.6 | 0.8 | 20 | 1.1 |
| 12 | 18.6 | 0.8 | 20 | 1.1 |
| 13 | 18.6 | 0.8 | 20 | 1.1 |
| 14 | 18.6 | 0.8 | 20 | 1.1 |
| 15 | 18.6 | 0.9 | 20 | 1.1 |

A common system for experimental measurement of the permeability of a filter medium based on the rate of flow of a fluid under a defined reassure differential is described in the text *Solid/Liquid Separation Technology* by Derek B. Purchas (1981) at pages 87–89. The system measures viscous permeability in a basic unit the "Darcy" where a material with a permeability of 1 darcy will pass in 1 second, through an area of 1 sq. cm. and a thickness of 1 cm., a volume of 1 ml of fluid with a viscosity of 1 cp, under a pressure differential of 1 atmosphere. Utilizing this system, the viscous permeability in Darcy units of the bed after each cycle is graphically shown in FIG. 7.

Figure 7:
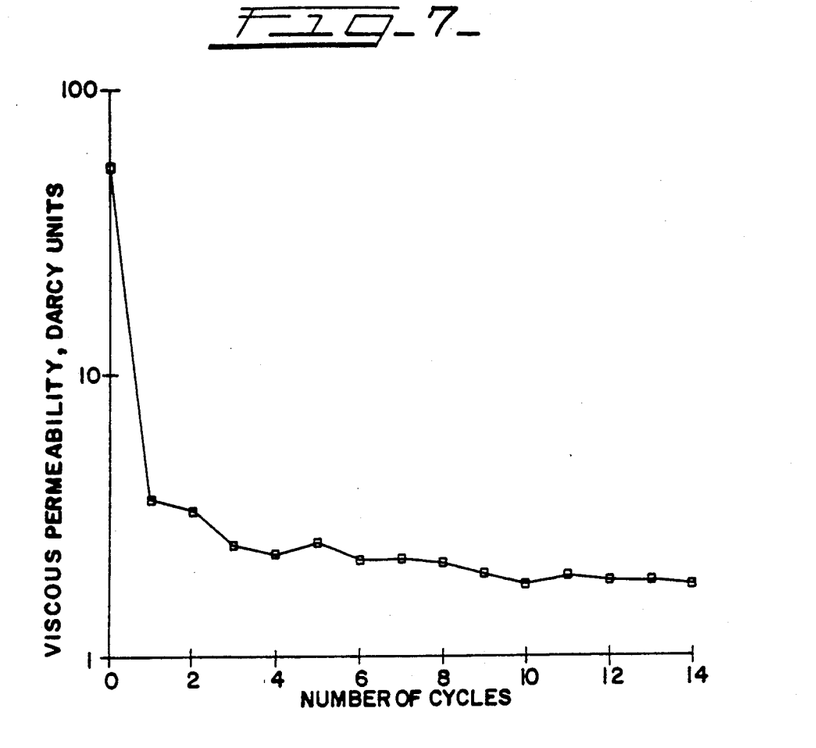
FIG. 7 is a graph showing the viscous permeability in Darcy units of a bed in accordance with the invention after a number of simulated regeneration cycles.

It should be observed that some degradation in hydraulic performance is apparent after the first three cycles. However, the performance then stabilizes and the pressure drop of the stabilized bed is such that it can be operated within the normal limits of columnar performance without difficulties.

It should be understood that modifications and changes to the preferred embodiments disclosed herein may be apparent to those of ordinary skill in the art without departing from the spirit and scope of the present invention, and without diminishing its attendant advantages. It is therefore intended that all such modifications and changes be covered by the following claims.

What is claimed is:

1. A method for removing substances from a liquid, comprising:
passing said liquid through a filter bed comprising a mixture of active particulate material in the size range of about 5.0 microns to about 100 microns, at a flow rate generally greater than about 0.02 gpm/ft², said mixture producing a clumping phenomenon, said filter bed having a depth in the range of about 3.0 inches to about 60 inches and having a pressure differential therethrough generally less than about 3.0 psi/in at a flow rate of 5.0 gpm/ft².

2. A method for removing substances from a liquid, comprising:
passing said liquid through a filter bed comprising a mixture of active particulate material in the size range of about 5.0 microns to about 100 microns and filter aid material having a charge opposite the charge of the active particle material, at a flow rate greater than about 0.02 gpm/ft², to remove the chemical products from the solution, said mixture producing a clumping phenomenon, said filter bed having a depth in the range of about 3.0 inches to about 60 inches and having a pressure differential therethrough generally less than 3.0 psi/in at a flow rate of 5.0 gpm/ft².

3. The method as defined in claim 2 wherein the flow rate is greater than about 0.2 gpm/ft².

4. The method as defined in claim 2 wherein the depth of said filter bed is in the range of about 10 inches to about 40 inches.

5. The method as defined in claim 2 wherein the pressure differential through said filter bed is generally less than about 1.0 psi/in at a flow rate of 5.0 gpm/ft².

6. The method as defined in claim 2 wherein the active particulate material is ion exchange resins.

7. The method as defined in claim 2 wherein the active particulate material is zeolite particles.

8. The method as defined in claim 2 wherein the filter aid material is cellulose fibers.

9. The method as defined in claim 2 wherein the filter aid material is hydrolyzed polyester fibers that have a surface charge opposite the surface charge of the active particulate material.

10. The method as defined in claim 2 wherein the filter bed further includes ballmilled anion exchange resins.

11. The method as defined in claim 2 wherein the said active particulate materially comprises from about 5 percent to about 99 percent by weight of said filter bed.

12. The method as defined in claim 10 wherein said ballmilled anion exchange resins comprise from about 0.5 percent to about 10 percent by weight of said filter bed.

13. The method as defined in claim 12 wherein said active particulate material comprises generally about 74 percent by weight of said filter bed, said filter aid material comprises generally about 25 percent by weight of said filter bed, and said ballmilled anion exchange resins comprises about 1.0% by weight of said filter bed.

14. A method for removing and recovering specific chemical products present in a solution, comprising:
passing said solution through a filter bed comprising a mixture of active particulate material selected to absorb the chemical products in the size range of about 5.0 microns to about 100 microns and filter aid material, at a flow rate greater than about 0.02 gpm/ft², to remove the chemical products from the solution, said mixture producing a clumping phenomenon, said filter bed having a depth in the range of about 3.0 inches to 60 inches and having a pressure differential therethrough generally less than 3.0 psi/ft² at a flow rate of 5.0 gpm/ft²; and
directing an eluting solution through said filter bed selected for recovering the chemical products from said filter bed.

15. The method as defined in claim 14 wherein the flow rate is greater than about 0.2 gpm/ft².

16. The method as defined in claim 14 wherein the depth of said filter bed is in the range of about 10 inches to about 40 inches.

17. The method as defined in claim 14 wherein the pressure differential through said filter bed is generally less than about 1.0 psi/in at a flow rate of 5.0 gpm/ft².

18. The method as defined in claim 14 wherein said active particulate material is ion exchange resins.

19. The method as defined in claim 14 wherein said filter aid material is cellulose fibers.

20. The method as defined in claim 14 wherein said filter aid material is hydrolyzed polyester fibers.

21. The method as defined in claim 14 wherein said filter bed further includes resin of an opposite charge from said active particulate material.

22. The method as defined in claim 21 wherein said resin of an opposite charge comprises from about 0.5 percent to about 10 percent by weight of said filter bed.

23. The method as defined in claim 22 wherein said resin of an opposite charge is ballmilled anion exchange resins.

24. The method as defined in claim 21 wherein said active particulate material comprises generally about 74 percent by weight of said filter bed, said filter aid material comprises generally about 25 percent by weight of said filter bed, and said resin of an opposite charge comprises generally about 1.0 percent by weight of said filter bed.

25. The method as defined in claim 2 including the step of periodically directing a regenerate liquid through said filter bed.

26. The method as defined in claim 14 including the step of periodically directing a regenerant liquid thorough said filter bed.

* * * * *